(12) United States Patent
Fogarty

(10) Patent No.: US 9,199,718 B2
(45) Date of Patent: Dec. 1, 2015

(54) AUTO-ROTATING DEVICE

(76) Inventor: Shaun P. Fogarty, Portland, OR (US)

(*) Notice: Subject to any disclaimer, the term of this patent is extended or adjusted under 35 U.S.C. 154(b) by 935 days.

(21) Appl. No.: 13/371,466

(22) Filed: Feb. 12, 2012

(65) Prior Publication Data

US 2012/0328441 A1 Dec. 27, 2012

Related U.S. Application Data

(60) Provisional application No. 61/442,177, filed on Feb. 12, 2011.

(51) Int. Cl.
*B64C 3/14* (2006.01)
*A63H 33/18* (2006.01)

(52) U.S. Cl.
CPC *B64C 3/14* (2013.01); *A63H 33/18* (2013.01); *B64C 2003/142* (2013.01); *Y02T 50/12* (2013.01)

(58) Field of Classification Search
CPC .... B64C 3/18; B64C 27/467; B64C 2203/00; B64C 3/14; B64C 2003/142; B64C 2003/147; A63H 33/18; A63H 33/185; Y02T 50/12
USPC .............. 244/38, 13, 17.11, 123.8, 46, 17.13, 244/23 R, 39, 138 A; 416/19, 226, 241 R; 446/34, 36, 61, 236; 273/362; 102/359, 102/386, 388
See application file for complete search history.

(56) References Cited

U.S. PATENT DOCUMENTS

| | | | | |
|---|---|---|---|---|
| 2,615,281 | A * | 10/1952 | Main | 446/34 |
| 4,047,839 | A * | 9/1977 | Ferris et al. | 416/134 A |
| 4,392,781 | A * | 7/1983 | Mouille et al. | 416/223 R |
| 4,583,703 | A * | 4/1986 | Kline | 244/3.24 |
| 4,886,222 | A * | 12/1989 | Burke | 244/1 R |
| 5,173,069 | A * | 12/1992 | Litos et al. | 473/590 |
| 5,839,700 | A * | 11/1998 | Nedderman, Jr. | 244/219 |
| 6,516,565 | B1 * | 2/2003 | Fima | 47/74 |
| 7,766,274 | B1 * | 8/2010 | Jameson et al. | 244/17.11 |
| 2006/0183398 | A1 * | 8/2006 | Barnes | 446/34 |
| 2008/0274663 | A1 * | 11/2008 | Dial | 446/34 |
| 2009/0123289 | A1 * | 5/2009 | Tangler et al. | 416/223 R |
| 2010/0324754 | A1 * | 12/2010 | Barrows | 701/3 |

* cited by examiner

*Primary Examiner* — Dwayne J White
*Assistant Examiner* — Joshua R Beebe
(74) *Attorney, Agent, or Firm* — Frank Marino

(57) ABSTRACT

A launchable device capable of autorotating flight. The device comprises a wing with two airfoils that induce this autorotating flight after launch and ascent.

19 Claims, 8 Drawing Sheets

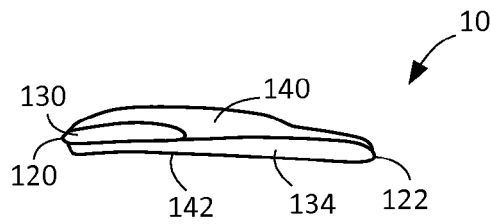
FIG. 4
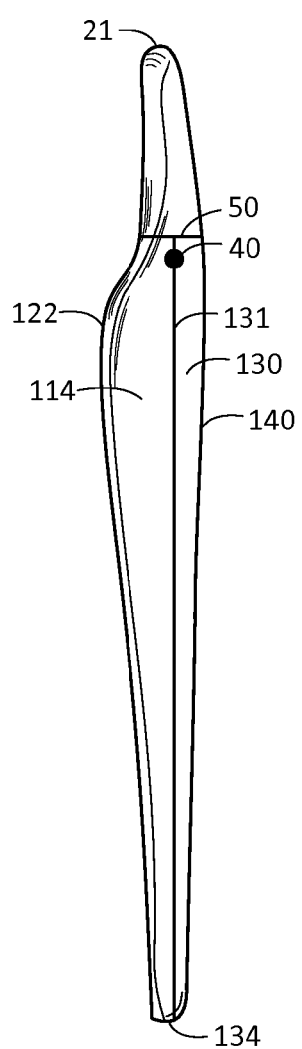
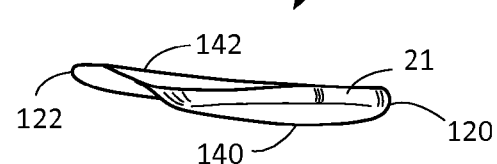
FIG. 5
FIG. 3
FIG. 2

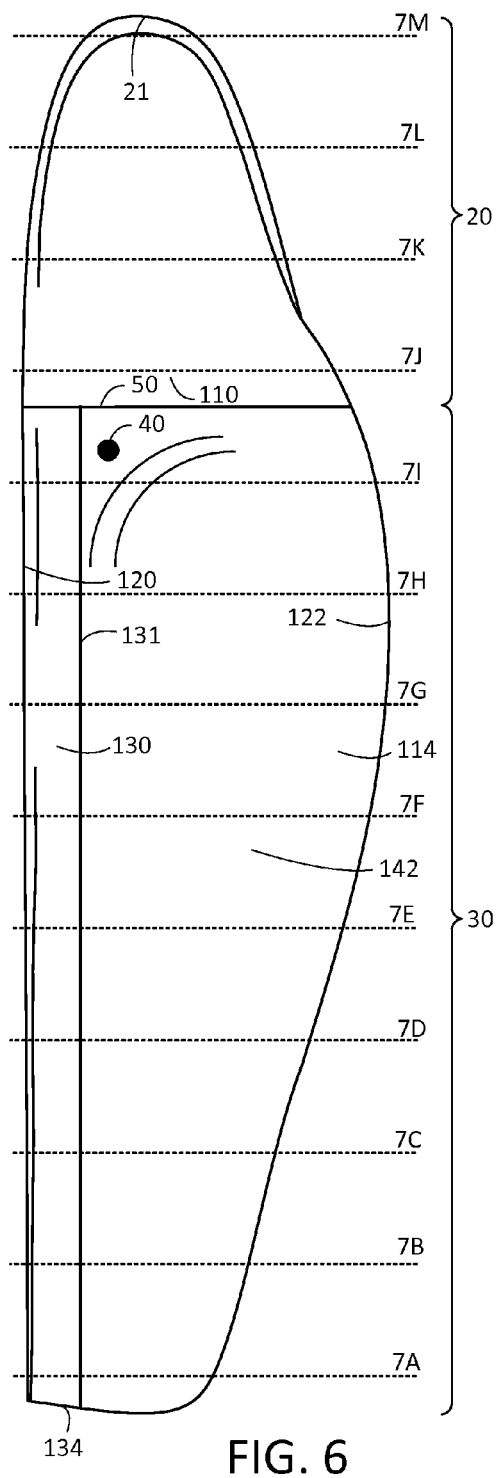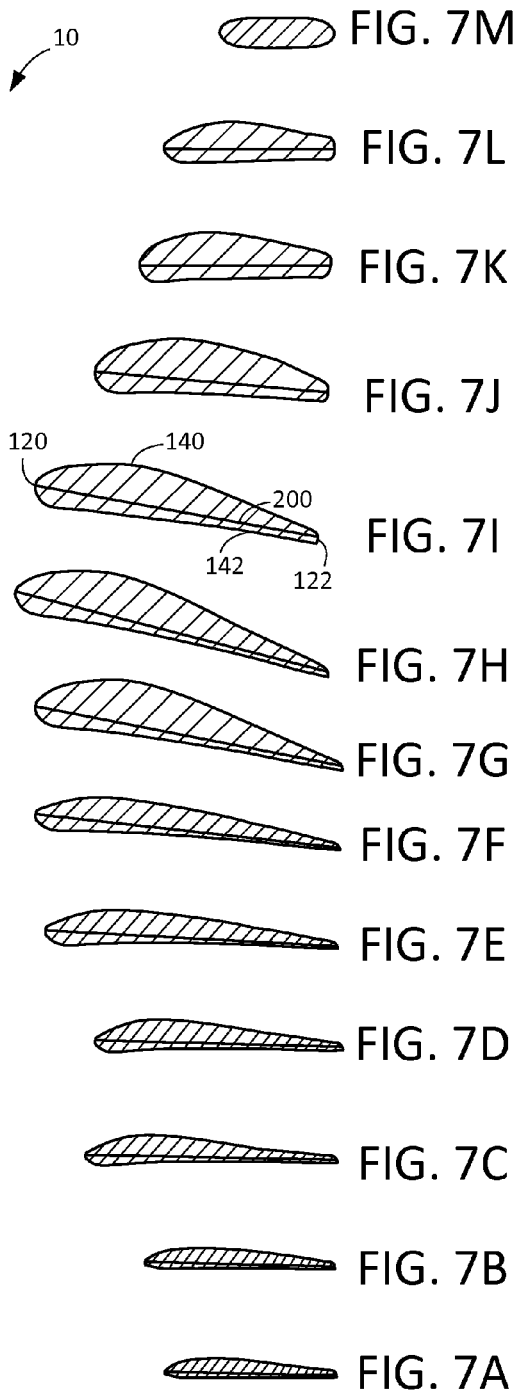
FIG. 6

AUTO-ROTATING DEVICE

BACKGROUND OF THE INVENTION

A samara is a simple dry fruit composed of a seed encased in an ovary wall that extends into a flattened wing or wings. The wings of samaras allow them to be carried by the wind when falling from their parent trees or plants. Maple seeds are a single-wing type of samara.

In aeronautical terms, a maple seed may be described as an "auto-rotating helicopter." When a maple seed falls from the tree on which it developed, it picks up speed and starts to rotate around its center of mass. The shape of the wing causes the airflow around the samara (as it drops through the air) to induce a spinning motion. The maple seed is described as "auto-rotating" because its spinning helicopter-like motion arises automatically as it falls through the air.

This auto-rotation provides a slow gliding descent in the presence of wind, allowing the maple seed to be carried by the wind away from its parent tree. The same gust of wind that causes the seed to break free of the tree may then carry that seed away. The maple seed has a relatively high "glide ratio" (the distance covered horizontally over distance dropped vertically) in the presence of wind, and therefore stays in the air longer and can travel further away from the parent tree than a typical seed or nut dropped through the air, thus providing a greater chance for the dispersal and propagation of the species.

Maple seeds and other samaras have inspired inventors and designers ever since human-powered flight was proven to be possible. Engineers and researchers have explored the nature of maple seed flight in order to understand it and adapt it to various technological applications. For example, recent published research, led by David Lentink, an assistant professor at Wageningen, and Michael H. Dickinson, the Zarem Professor of Bioengineering at Caltech, revealed that, by swirling, maple seeds generate a tornado-like vortex that sits atop the front leading edge of the seed's wing as it spins slowly to the ground. This leading-edge high-turbulence vortex lowers the air pressure over the upper surface of the maple seed, effectively exerting pressure on the wing in the opposite direction that gravity is pulling it, thereby giving it some lift to counteract gravity's pull. This vortex provides the maple seed approximately twice the lift generated by non-swirling gliding seeds. See, e.g., http://www.popsci.com/military-aviation-amp-space/article/2009-06/inspired-spinning-maple-seeds-tested-robofly; http://www.youtube.com/watch?v=ce2HUKizMTw (confirmed 19 Dec. 2010).

Man-made versions of maple seeds and other samaras have demonstrated very limited use. For example, researchers at the University of Maryland are designing and building robotic fliers that mimic samaras. See, e.g., http://www.av-l.umd.edu/projects/projll-robotic-samara.html (confirmed on 19 Dec. 2010). Ned Allen, an aeronautical engineer, is leading a team at Lockheed Martin's Advanced Technology Lab (ATL) in the development of a simple maple seed-type samara device (the "ATL device") for use in military and surveillance applications. See, e.g., http://www.atl.lmco-.com/news/techfeatures/TODAY0706/TODAY_Nano.pdf (confirmed on 19 Dec. 2010). However, these and other known devices provide simple samara-like auto-rotating helicopters with similar flight characteristics that are literally based on the natural seeds, that is, turbulence-based in their lift creation and utilizing a simple "plate" wing and, in the case of the ATL device, a device that does not have a designated top or bottom surface to its wing. Thus, a need exists for simple, functional, well designed single-wing samara-like auto-rotating devices that utilize more efficient lift-producing airfoil sections in the wing and chassis geometry in order to increase payload, efficiency, predictability, and operational flexibility.

BRIEF SUMMARY OF THE INVENTION

A launchable auto-rotating device with a single-wing configuration. The device comprises two airfoil shapes when viewed in section along its long and short axes. When launched vertically, the device will travel upwards in a smooth trajectory without rotating (similar to a rocket or ball) and then transition to an auto-rotating flight to glide back to the ground. The structure of the device, particularly the novel arrangement of airfoils and design of the wing, generates lift that slows its descent. In the presence of wind, the device will have a high glide ratio.

The device is capable of auto-rotating when dropped through a fluid, though particular embodiments are designed for flight through a gas (and more particularly, through the air). The device comprises a body and a wing that are formed together or coupled together. The body and wing define a junction where they are coupled together, or in the case of a unibody construction, the junction is considered to be the area where the body portion of the piece transitions to the wing portion of the piece. In some embodiments, the device's center of mass is located within the junction, while in alternative embodiments, the device's center of mass is located substantially adjacent to the junction.

The wing itself comprises a joint end or base (proximal to the body), a tip (distal to the body), a leading edge, and a trailing edge. The leading edge is defined according to the orientation of the wing during auto-rotating flight.

One particularly novel (but non-limiting) feature of the device is that the device comprises two airfoils: a first airfoil shape when sectioned along its width, and a second airfoil shape when sectioned along its length.

In particular embodiments of the device, the wing further comprises a reinforcing spar. Alternative embodiments also include a protruding hook that provides an anchor point for a launcher, such as a sling-shot. Additionally, some embodiments comprise a payload mounted on or coupled to the body in order to alter the flight characteristics of the device on ascent or descent.

BRIEF DESCRIPTION OF THE SEVERAL VIEWS OF THE DRAWING

FIG. 2 is a side view from the leading edge of the device of FIG. 1.

FIG. 3 is a side view from the trailing edge of the device of FIG. 1.

FIG. 4 is an end view from the tip of the wing of the device of FIG. 1.

FIG. 5 is an end view from the nose of the body of the device of FIG. 1.

FIG. 6 is a bottom view of the device of FIG. 1.

FIGS. 7A through 7M are latitudinal section views (simplified for clarity) of FIG. 6 showing one of the two airfoil shapes of the device.

DETAILED DESCRIPTION OF THE INVENTION

Figure 1:
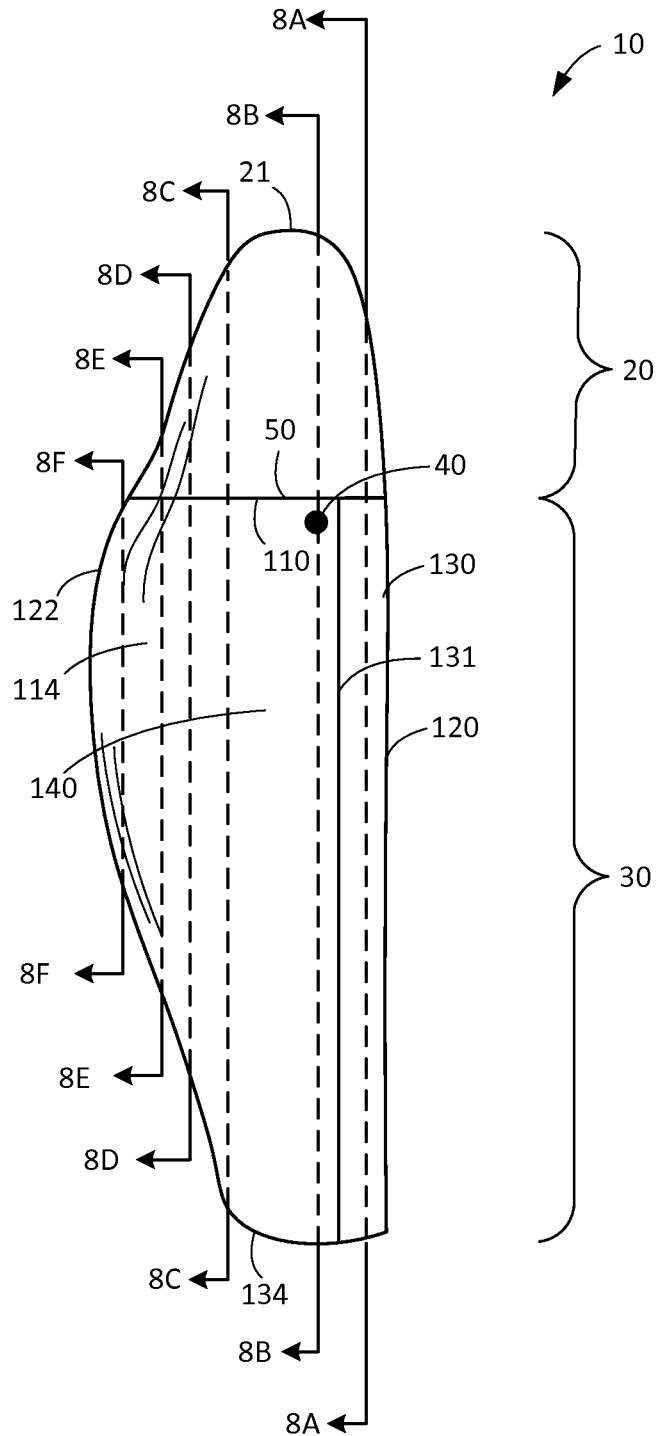
FIG. 1 is a top view of an exemplary embodiment of the auto-rotating device.
Figures 8A, 8B, 8C, 8D, 8E, 8F:
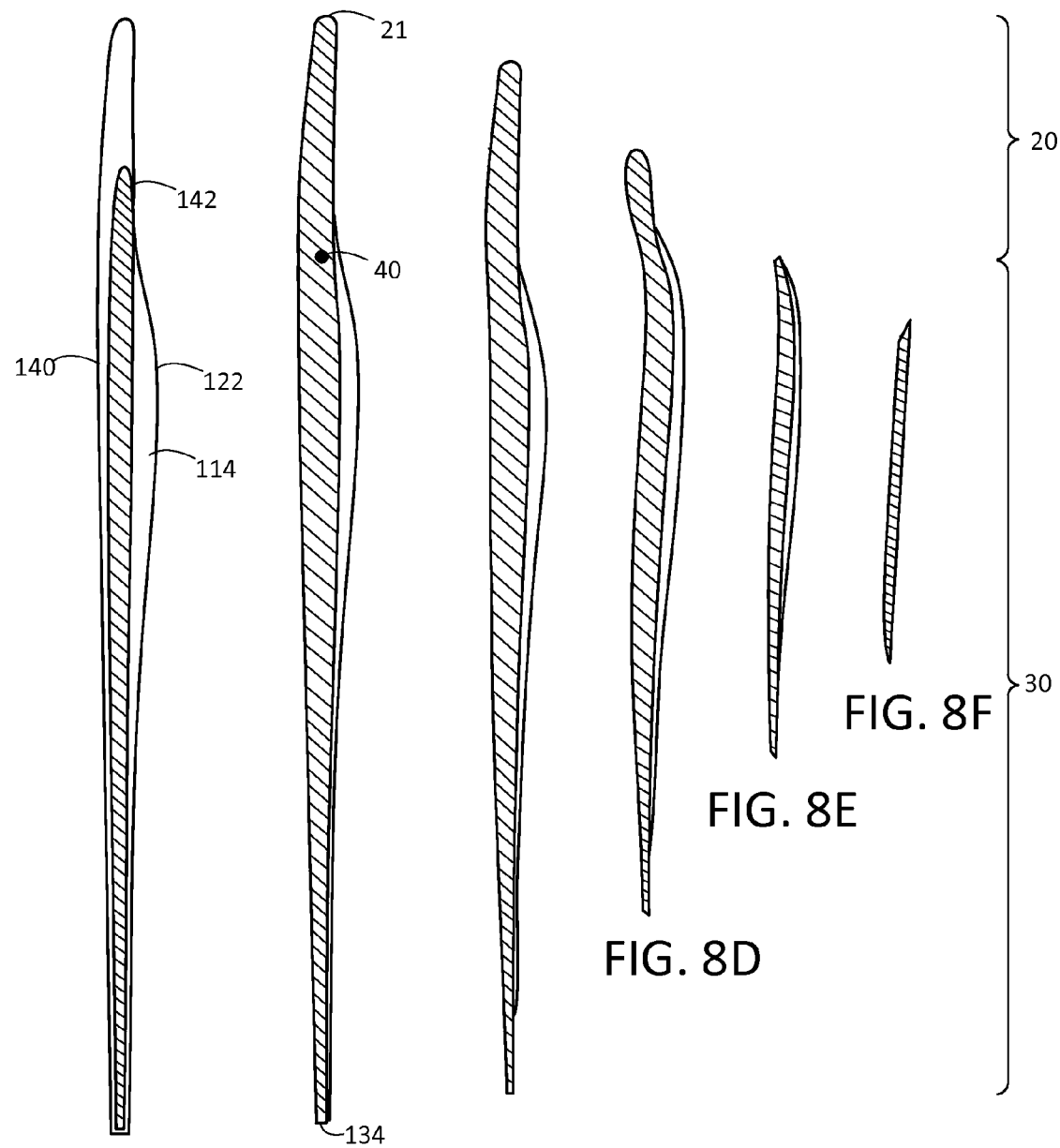
FIGS. 8A through 8F are longitudinal section views of FIG. 1 showing the other of the two airfoil shapes of the device.

One exemplary, non-limiting embodiment of the auto-rotating device is depicted in FIGS. 1 through 8. The auto-rotating device, generally indicated as 10, comprises a body 20 coupled to a wing 30 at junction 50. The wing 30 extends away from the body 20. The body 20 has a nose 21. The device's center of mass 40 is located in the wing 30, adjacent to the junction 50.

The wing 30 comprises: a joint end 110 coupled to the body 20 at junction 50; a tip 134; a leading edge 120; and a trailing edge 122. The joint end 110 of wing 30 can also be considered the base 110 of the wing 30. In this particular embodiment, the trailing edge 122 of the wing 30 further comprises a rounded extension 114.

The nose 21, the leading edge 120, the tip 134, and the trailing edge 122, together generally define the perimeter of the profile of the device 10 when it is viewed from the top or the bottom, as in FIGS. 1 and 6.

The device 10 has a top surface 140 and a bottom surface 142. Specifically, during auto-rotating flight, the bottom surface 142 faces the direction in which gravity is acting (i.e., down, toward the center of the earth) and the top surface 140 faces the opposite direction (i.e., up, toward the sky). The top surface 140 comprises a substantially convex portion of the wing 30, while the bottom surface 142 comprises a substantially concave portion of the wing 30. This concavity and convexity is especially pronounced, but not solely present, in the rounded extension area 114.

FIG. 6 shows the underside device 10. The underside of the device is the side comprising the bottom surface of the wing, while the topside of the device is the side comprising the top surface of the wing. FIGS. 7A through 7M are cross-section views showing how the shape of the device 10 changes along its length, from the tip 134 to the nose 21. Each section view is bounded: on the top by the top surface 140; on the left by the leading edge 120, on the bottom by the bottom surface 142, and on the right by the trailing edge 122.

The section views in FIGS. 7A through 7M show one of the two cambered airfoil shapes manifested in the device 10. In each section view, a chord line 200 connects the point of maximum curvature of the leading edge 120 to the point of maximum curvature of the trailing edge 122.

The angle of attack of each section shown in FIGS. 7A through 7M is the angle between the chord line 200 and the direction in which the leading edge 120 of the device 10 is moving. The section views in FIGS. 7A through 7M show that the angle of attack of the airfoil shape of the device 10 increases along the wing 30 from the tip 134 to the joint end 110 of the wing 30 for a portion of the length of the wing 30. In this particular, illustrated embodiment, the angle of attack is about one degree in the FIG. 7A section (adjacent to the tip 134 of wing 30) and increases to about one-and-one-half degrees in the FIG. 7B section. The increasing angle of attack is about two degrees in the FIG. 7C section, further increasing to about two-and-one-half degrees in the FIG. 7D section, further increasing to about three degrees in the FIG. 7E section, further increasing to about five degrees in the FIG. 7F section, and then further increasing to as much as about six degrees in the FIG. 7G section. The angle of attack then starts decreasing along the length of wing 30 to about four degrees in the FIG. 7H section, then decreasing to about two degrees in the FIG. 7I section adjacent to junction 50. The angle of attack within the body 20 decreases further to about one-half of one degree in the FIG. 7J section, and finally further decreases to about zero degrees in the FIGS. 7K and 7L sections.

FIGS. 8A through 8F are longitudinal section views showing how the shape of the device 10 changes along its width, from the leading edge 120 to the trailing edge 122. Each section view is bounded on the left by the top surface 140, and on the right by the bottom surface 142. These section views show the other cambered airfoil shape manifested in the device 10.

In some embodiments, the wing 30 and body 20 are of unibody construction (such as being co-molded or formed out of one piece of material together). In other embodiments, the wing 30 and body 20 separate parts that are coupled together.

Figures 9, 10, 11:
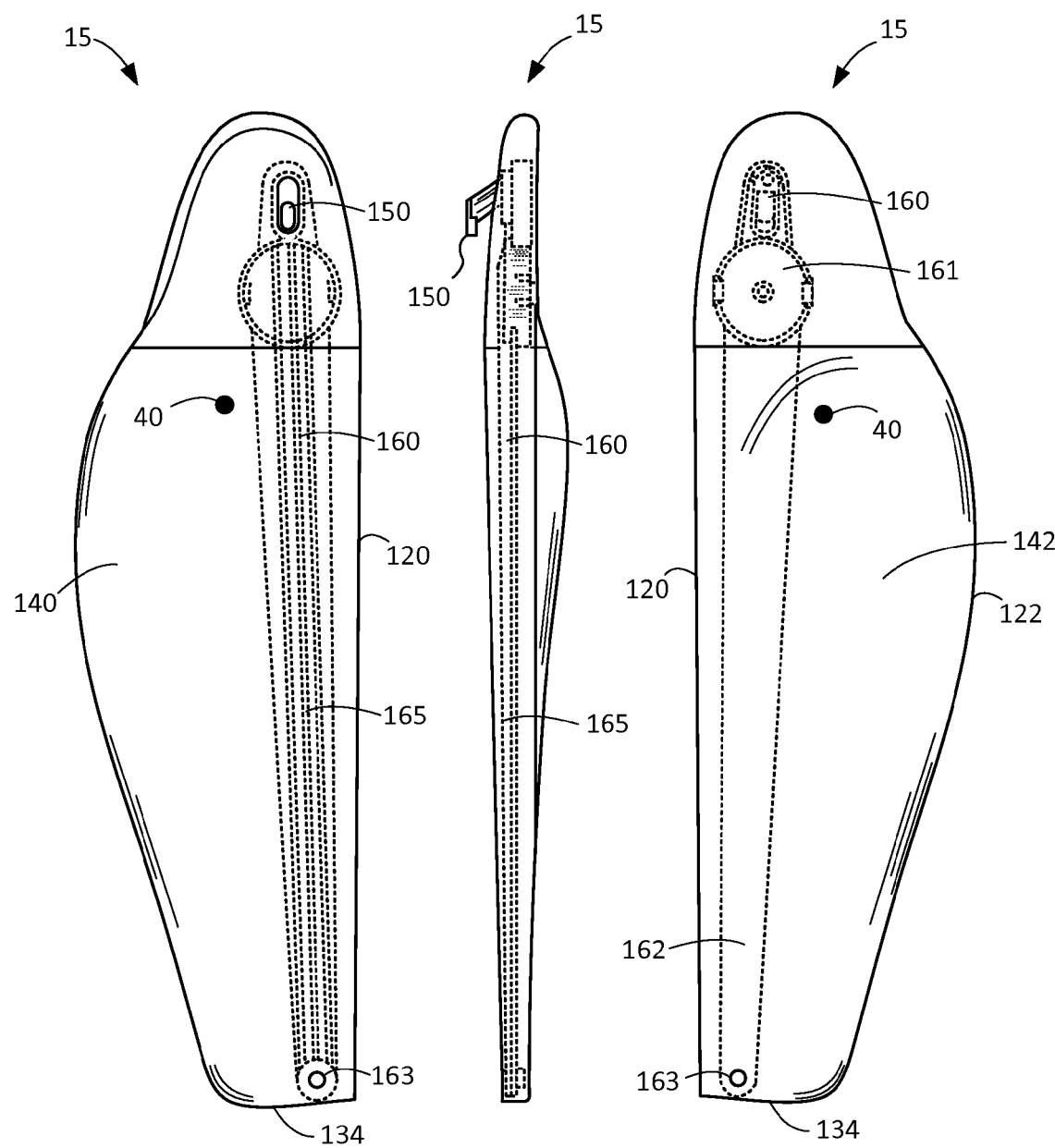
FIG. 9 is a top view of another exemplary embodiment of the auto-rotating device which has inside it a spar assembly with a protruding hook.
FIG. 10 is a side view from the leading edge of the device of FIG. 9.
FIG. 11 is a bottom view of the device of FIG. 9.

FIGS. 9 through 11 depict another exemplary, non-limiting embodiment of the device, generally indicated as 15. Like the device 10 of FIGS. 1 through 6, the device 15 of FIGS. 9 through 11 has a body 20, a nose 21, a wing 30, a joint end 110 of the wing 30, a tip end of the wing 30, a junction 50, a leading edge 120, a trailing edge 122, a rounded extension 114, a top surface 140, a bottom surface 142, and a center of mass 40.

The chief distinction between the embodiment of FIGS. 9 through 11 and the embodiment of FIGS. 1 through 6 is the presence in FIGS. 9 through 11 of an assembly 160 that comprises payload 161, a spar 162, and a hook 150. The payload 161 allows adjustment of the device's center of mass 40, which can alter the flight characteristics of the device during ascent and descent. In particular embodiments, payload 161 is a metal disk or washer, though alternative embodiments employ more sophisticated payloads, such as sensors, radio transceivers, or munitions. The spar 161 is an elongated member of rigid material, such as plastic, wood, or metal that provides reinforcing structural support to the wing 30. Spar 161 includes a first end coupled to the body 20 and a second end located within the wing 30. In this particular illustrated embodiment, the spar 162 also includes stiffening ribs 165 that extend from the spar 162 toward the top surface 140 of the device 15. The spar 130 also comprises the area of the wing 30 between and including the leading edge 120 and the spar line 131. In this embodiment, the spar 162 also comprises a hook 150 from protruding from the top surface 140 of the body 20 through a hole 163 in the body 20. This hook provides an anchor point for an assistive device used to launch the device vertically, such as an elastic band or sling-shot.

Figure 12:
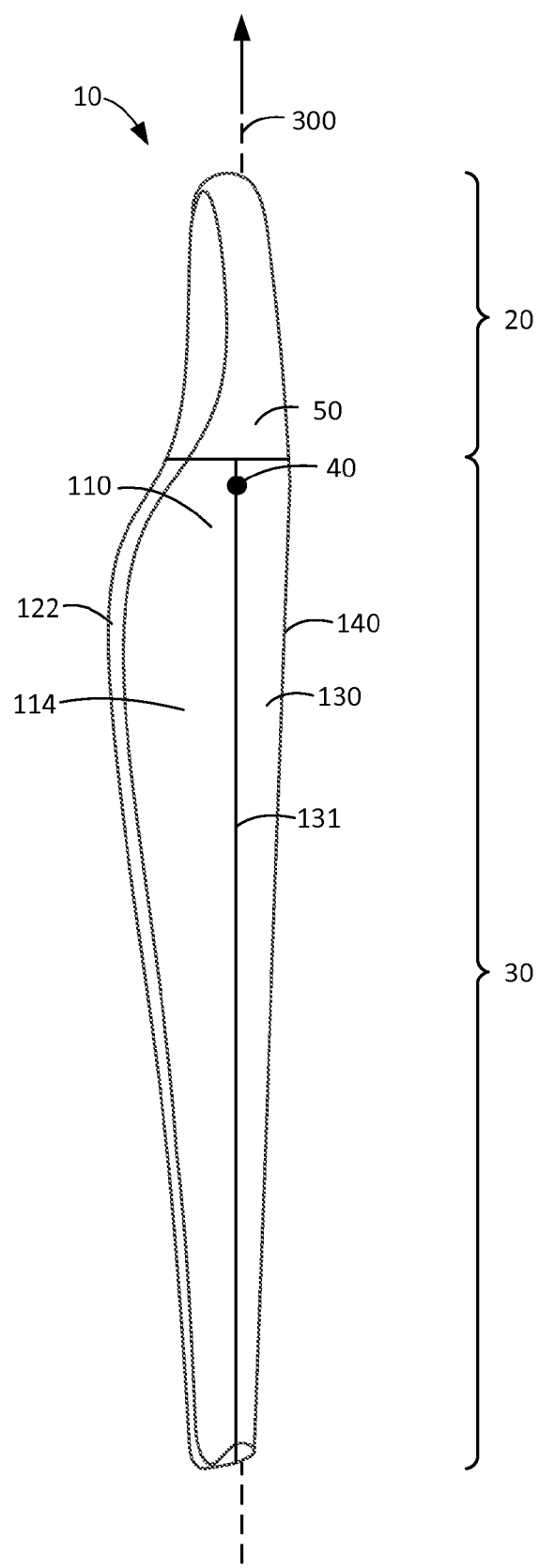
FIG. 12 is a side view from the trailing edge of the device of FIG. 1 during a vertical launch of the device.

FIG. 12 shows a vertical launch of the device 10. During the vertical launch phase, the device 10 rotates around the vertical launch spinning axis 300. This rotation is caused by the second airfoil shape of the device 10 that is shown in FIGS. 8A through 8F.

Vertical launch can be accomplished in several ways. One way is to seat the hook 150 of the device 15 around a piece of elastic material (for example, elastic material configured as a slingshot), then pull the device 15 toward the ground by the tip 134, and then release the device 15 such that the elastic material launches it skyward.

Figure 13:
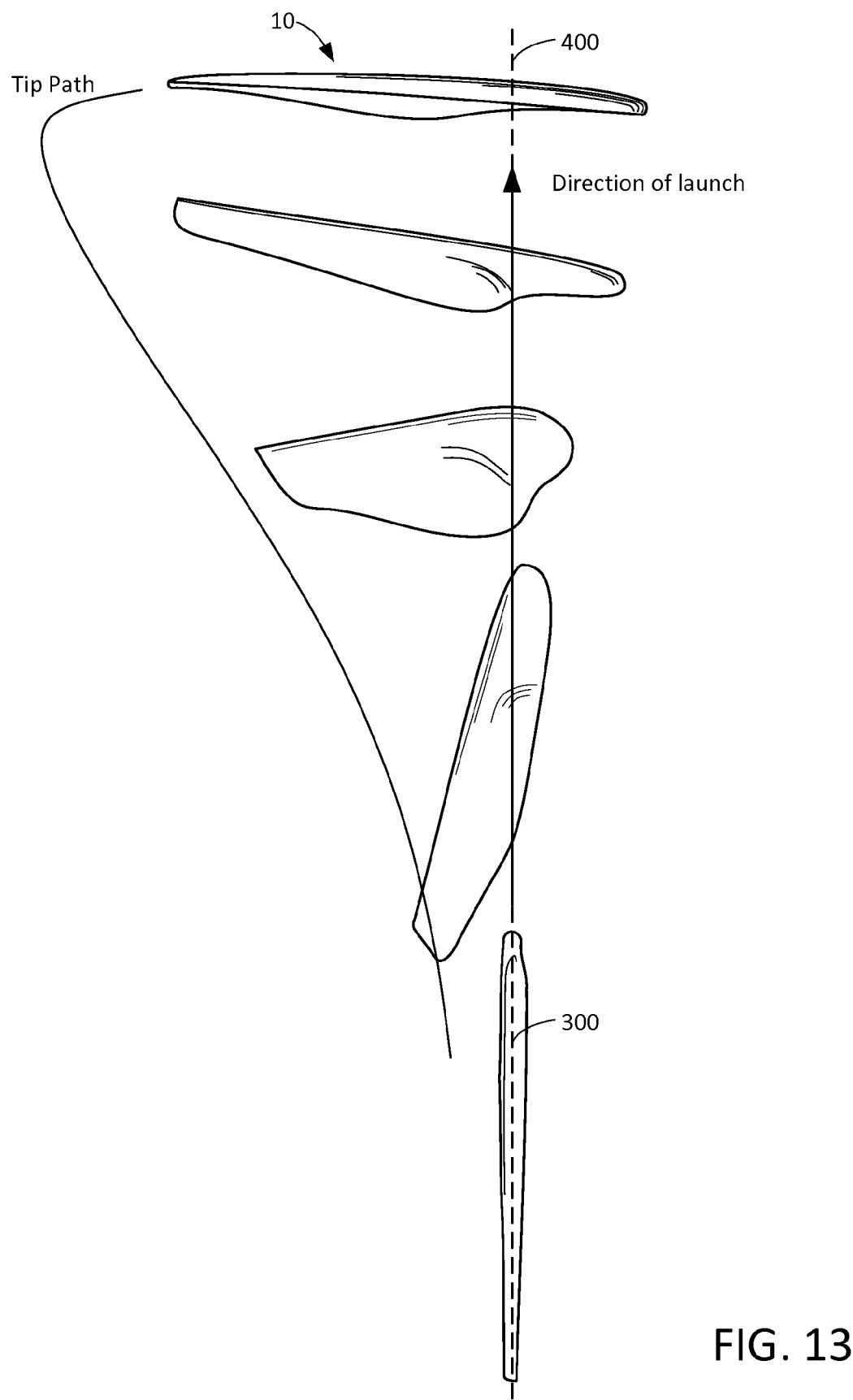
FIG. 13 is a series consisting of a side view from the trailing edge, three perspective views, and another side view from the trailing edge, of the device of FIG. 1 showing its transition from its position during vertical launch to its position during auto-rotating flight, and also showing the path of the tip of the device.

FIG. 13 shows how the device 10 transitions, at the apogee of its vertical launch, from a vertical launch orientation with the nose 21 pointing up and the device 10 rotating around the vertical launch spinning axis 300, to a horizontal auto-rotating orientation with the top surface 140 pointing up and the device 10 rotating around the auto-rotating flight spinning axis 400. Thus, the device 10 generates its own lift. The aerodynamic features of the device 10 cause it to shift to the proper orientation for auto-rotating flight once it nears apogee and enters a state of free-fall, and the auto-rotation generates the lift necessary to maintain flight, rather than merely falling back to earth as a static object.

Figure 14:
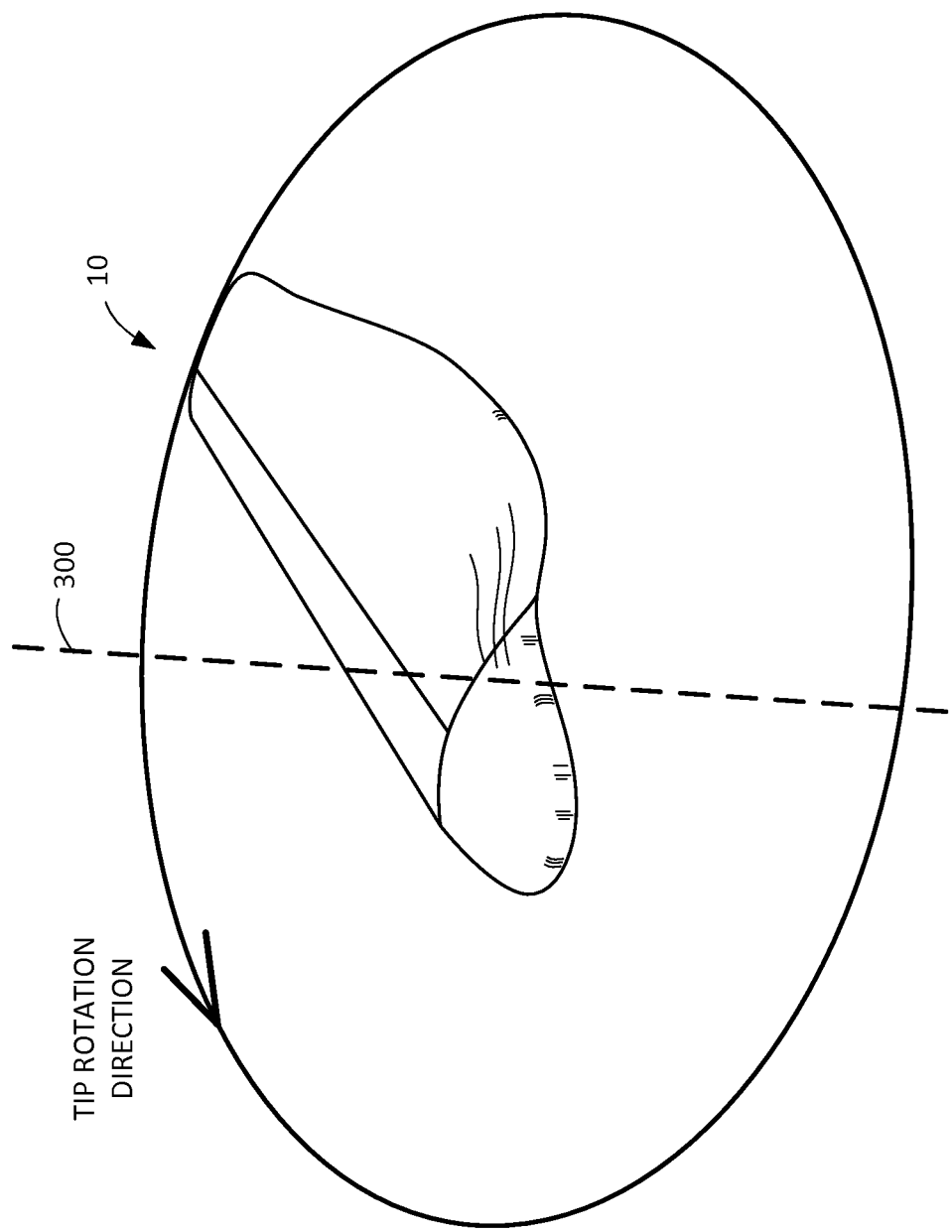
FIG. 14 is a perspective view the device of FIG. 1 during auto-rotating flight showing the direction of rotation of the tip of the device.

FIG. 14 depicts the device 10 during its auto-rotating flight. When in flight, the device 10 exhibits an auto-rotating motion in which the wing 30 and the body 20 rotate around the auto-rotating flight spinning axis 400 at a point that substantially comprises the device's center of mass 40. Thus, the mass and placement of a payload 161 can alter the flight characteristics of the device 10 by altering the position of the device's center of mass 140.

I claim:

1. A device capable of auto-rotating when dropped through a fluid, comprising: a body and a wing;
    said body comprising a nose;
    said wing comprising a joint end adjacent to said body, a tip distal from said body, a leading edge, and a trailing edge; and a varying camber line;
    said body and said wing coupled at a junction;
    said device further comprising a first cambered shape when sectioned along its width, a second cambered shape when sectioned along its length; and a center of mass substantially adjacent to said junction;
    said camber line comprising a line across the wing's width from the leading edge to the trailing edge, at any location along the wing's length; wherein
    both said first and second cambered shapes have a convex upper surface and a concave lower surface;
    said wing further comprises a pronounced concavity and a rounded extension area;
    said rounded extension area comprises a curvilinear extension protruding from said trailing edge, all of the curvilinear extension protruding above camber line; and
    said pronounced concavity comprises a pronounced depression in said concave lower surface in said rounded extension area.

2. The device of claim 1, wherein said wing comprises a spar coupled to the body and extending along said leading edge of said wing.

3. The device of claim 2, wherein the spar is a substantially straight elongated member.

4. The device of claim 1, wherein said first cambered shape has a varying angle of attack; said angle of attack being the angle between horizontal and the camber line.

5. The device of claim 4, wherein the angle of attack of said first cambered shape is about zero degrees in the area of said first cambered shape adjacent to the nose, the angle of attack of said first cambered shape is about six degrees in the area of said first cambered shape equidistant from said nose and said tip, and the angle of attack of said first cambered shape is about one degree in the area of said first cambered shape adjacent to said tip.

6. The device of claim 1 wherein said device rotates about said center of mass when dropped through a fluid.

7. The device of claim 1, wherein said device further comprises a spar assembly within said device.

8. The device of claim 7, wherein said spar assembly comprises an elongated flattened and ribbed member with a first end and a second end, the first end being adjacent to said nose, the second end being adjacent to said tip.

9. The device of claim 1, wherein the device further comprises a payload coupled to the body and movable relative thereto, to vary the disposition of the center of mass.

10. The device of claim 1, wherein said body further comprises a hook protruding there-from, including a hook end directed towards said wing tip.

11. A lift-generating device comprising: a body and a wing;
    said body comprising a nose;
    said wing comprising a joint end adjacent to said body, a tip distal from said body, a leading edge, and a trailing edge; and a varying camber line;
    said body and said wing coupled at a junction;
    said device further comprising a first cambered shape when sectioned along its width, a second cambered shape when sectioned along its length, both said first and second cambered shapes having a convex upper surface and a concave lower surface; and a center of mass substantially adjacent to said junction;
    said camber line comprising a line across the wing's width from the leading edge to the trailing edge, at any location along the wing's length; wherein
    both said first and second cambered shapes have a convex upper surface and a concave lower surface;
    said wing further comprises a pronounced concavity and a rounded extension area;
    said rounded extension area comprises a curvilinear extension protruding from said trailing edge, all of the curvilinear extension protruding above camber line; and
    said pronounced concavity comprises a pronounced depression in said concave lower surface in said rounded extension area.

12. The device of claim 11 wherein said device rotates about said center of mass when dropped through a fluid.

13. The device of claim 12 wherein the fluid is air.

14. The device of claim 11 wherein said first cambered shape has a varying angle of attack; said angle of attack being the angle between horizontal and the camber line.

15. The device of claim 14 wherein the angle of attack of said first cambered shape is about zero degrees in the area of said first cambered shape adjacent to the nose, the angle of attack of said first cambered shape is about six degrees in the area of said first cambered shape equidistant from said nose and said tip, and the angle of attack of said first cambered shape is about one degree in the area of said first cambered shape adjacent to said tip.

16. The device of claim 11 wherein the device further comprises a payload coupled to the body and movable relative thereto, to vary the disposition of the center of mass.

17. The device of claim 11 wherein said wing comprises a spar coupled to the body and extending along said leading edge of said wing.

18. The device of claim 11, further comprising a spar assembly, the spar assembly comprising an elongated flattened and ribbed member and a hook, the elongated flattened and ribbed member having a first end and a second end, the first end being coupled to the body adjacent to said nose, the second end being adjacent to said tip.

19. The device of claim 11, wherein said body further comprises a hook protruding there-from, including a hook end directed towards said wing tip.

* * * * *